US008751811B2

(12) United States Patent
Meyn et al.

(10) Patent No.: US 8,751,811 B2
(45) Date of Patent: Jun. 10, 2014

(54) INTEGRATED CIRCUIT AND SYSTEM FOR INSTALLING COMPUTER CODE THEREON

(75) Inventors: Hauke Meyn, Krempermoor (DE); Ralf Malzahn, Seevetal (DE)

(73) Assignee: NXP B.V., Eindhoven (NL)

( * ) Notice: Subject to any disclaimer, the term of this patent is extended or adjusted under 35 U.S.C. 154(b) by 733 days.

(21) Appl. No.: 12/967,349

(22) Filed: Dec. 14, 2010

(65) Prior Publication Data

US 2011/0145586 A1 Jun. 16, 2011

(30) Foreign Application Priority Data

Dec. 14, 2009 (EP) .................................... 09179104

(51) Int. Cl.
*H04L 29/06* (2006.01)
*H04L 9/32* (2006.01)
*G11B 20/00* (2006.01)
*G06F 21/72* (2013.01)

(52) U.S. Cl.
CPC ........ *H04L 9/3281* (2013.01); *G11B 20/00086* (2013.01); *G06F 21/72* (2013.01)
USPC ....................................................... 713/176

(58) Field of Classification Search
None
See application file for complete search history.

(56) References Cited

U.S. PATENT DOCUMENTS

| | | | |
|---|---|---|---|
| 5,841,866 A * | 11/1998 | Bruwer et al. .................. 705/66 |
| 6,823,451 B1 * | 11/2004 | Gulick et al. ................. 713/153 |
| 7,124,938 B1 * | 10/2006 | Marsh ............................ 235/382 |
| 7,251,730 B2 | 7/2007 | Rose et al. |
| 8,171,531 B2 * | 5/2012 | Buer ................................. 726/6 |
| 2003/0065956 A1 * | 4/2003 | Belapurkar et al. .......... 713/202 |
| 2004/0147251 A1 | 7/2004 | Nakayama et al. |
| 2005/0149457 A1 * | 7/2005 | Cihula ............................. 705/65 |
| 2005/0229011 A1 | 10/2005 | Ebringer et al. |
| 2006/0291660 A1 * | 12/2006 | Gehrmann et al. ........... 380/277 |
| 2007/0028118 A1 * | 2/2007 | Brown et al. .................. 713/185 |
| 2007/0118891 A1 * | 5/2007 | Buer ................................. 726/8 |
| 2007/0250704 A1 * | 10/2007 | Hallam-Baker ............... 713/156 |
| 2011/0131421 A1 * | 6/2011 | Jogand-Coulomb et al. . 713/189 |

FOREIGN PATENT DOCUMENTS

| | | |
|---|---|---|
| EP | 1 182 534 A2 | 2/2002 |
| EP | 1637958 | 3/2006 |

OTHER PUBLICATIONS

Extended European Search Report for Patent Appln. No. 09179104.6 (Jun. 29, 2010).

* cited by examiner

*Primary Examiner* — Jason K. Gee
*Assistant Examiner* — Maung Lwin

(57) ABSTRACT

An integrated circuit 100 is provided, which is configured for authentication itself and technical information concerning the integrated circuit or its installed software to an external computing device 200. The integrated circuit 100 comprises a signer 130 for producing a signature over the information and a challenge using a cryptographic signing key, and a communication module 110 for providing the information and the signature to the computing device 200. In response to receiving the information and the authentication, the computing device 200 may install new application code on the integrated circuit. After the installation, the integrated circuit may authenticate information concerning the new application code to other computing devices. The integrated circuit is advantageously a multiple application smart card, since it allows application providers to obtain trust in the multiple application smart card without having a relationship with its manufacturer.

19 Claims, 3 Drawing Sheets

INTEGRATED CIRCUIT AND SYSTEM FOR INSTALLING COMPUTER CODE THEREON

CROSS-REFERENCE TO RELATED APPLICATIONS

This application claims the priority under 35 U.S.C. §119 of European patent application no. 09179104.6, filed on Dec. 14, 2009, the contents of which are incorporated by reference herein.

FIELD OF THE INVENTION

The invention relates to an integrated circuit comprising a communication module for providing information representing technical capabilities of the integrated circuit to a computing device external to the integrated circuit.

The invention further relates to a system for installing application computer code on an integrated circuit.

The invention further relates to a method of providing information representing technical capabilities of an integrated circuit to a computing device external to the integrated circuit, a method of installing application computer code on an integrated circuit and a corresponding computer program.

BACKGROUND OF THE INVENTION

Many companies use integrated circuits, e.g., secure microcontroller systems like smart card ICs, to deliver services to consumers. Examples are payment cards, payment tokens, public transport cards, Subscriber Identity Module (SIM) cards for mobile phones, health cards, etc.

Integrated circuits are often at the heart of commercial applications connected with large financial interest. The integrated circuit comprises confidential, proprietary information such as cryptographic keys, executable computer code, etc, stored in a memory of the integrated circuit. Examples include, banking applications wherein the integrated circuit is responsible for the authentication of money transfers and content distribution systems wherein the integrated circuit is responsible for restricting access to the content to subscribers to the distribution systems.

For example, content distribution may be done over a network comprising multiple set-top boxes. In each set-top box an integrated circuit, typically integrated in a smart card, comprises secret cryptographic keys and/or secret decrypting algorithms for decrypting content, e.g. music, movies, etc, and/or decrypting further cryptographic keys. Further cryptographic keys may include, for example, so-called Control Words (CW), Entitlement Control Messages (ECM) and Entitlement Management Messages (EMM). Further cryptographic keys may be used for increased security and regional control.

Naturally, the security of these integrated circuits is important. Persons who try to manipulate integrated circuits, in particular smart cards, or use information contained thereon in an illegal and/or unauthorized manner will be referred to as 'attackers'. If an attacker manages to break the security of an integrated product he may be able to perform or initiate transactions for which he is not authorized.

Today those integrated circuits systems are typically application provider centric. This means that the product is defined and controlled by the application provider and that this entity is also the issuer of the hardware to provide a service, e.g. a smart card. Consider a banking card as an example. The issuing bank defines the product including the secure hardware, the operating system (software) as well as the application(s) being used. The source of all of the components is known to the issuer. Even though the bank did not manufacture the card himself he has selected all the components himself, and so has a reasonable basis for trusting the resulting integrated circuit.

However, as more and more services require a secure integrated circuit, in particular a smart card, to obtain access to the service, it becomes less viable to use a different smart card for each new application and/or service. Integrated circuits, in particular a smart cards, may be provided to a customer, which circuits are configured to receive an application after the circuit has been delivered to the customer.

Examples for such products are NFC enabled mobile phones or smart-cards configured for multiple applications. The hardware issuer of these devices is independent of the application provider. In particular, the application provider may not have selected the hardware manufacturer himself. The application provider may not even know who manufactured the integrated circuit. Even if the application provider is told who the manufacturer is, he does not know if the can trust this information. Typically, the application provider has no knowledge about the product details, such as hardware details of the circuit which has been provided by the hardware manufacturer.

For example, an application provider of some sort, e.g. a bank, a content provider, a loyalty program, etc, may download an application to an integrated circuit to enable that integrated circuit with new functionality. The new functionality allows the owner of the integrated circuit on which the application is installed access to new services, such as banking, content, and loyalty programs, respectively.

When a consumer wants a new service installed in his integrated circuit, he may contact a selected application provider. The application provider should enable the new service in the customer's integrated circuit. Before installing a new application on the integrated circuit, the application provider would like to know if the customer's integrated circuit is capable of running the new application. For security related services this may include ascertaining that the product is sufficiently secure.

Assuming there are a lot of companies providing products containing integrated circuits on which applications may be installed. The application provider will typically not trust them all. In particular, if the application which is to be installed is sensitive, security wise, he will be hesitant to install his application since he cannot manage the risk. Without installing the new application, the integrated circuit does not obtain access to the new service corresponding to it, and consequently the application provider is not able to provide the service to the customer.

Various risks are associated with installing an application on untrustworthy hardware. For example, an attacker may try to get an application provider to install his application on hardware which is under his control. In particular, on hardware that allows the attacker access to the installed application or even on hardware that allows the attacker to modify the installed application.

Although computer application code, like cryptographic algorithms which may be embedded in it, are typically designed to be robust and secure even when their content is revealed to an attacker, in practice it may be wise to make an effort to keep these assets secret. From the moment, a cryptographic algorithm such as an encryption, decryption, signing, verifying algorithm, etc, or computer code such as operating system code, device drivers, application code, access algorithms etc, are known to attackers they can start screening the algorithm or code for weaknesses. Cryptographic algorithms may allow cryptographic attacks which were not anticipated by the designer of the algorithms. Software code may comprise faults, also known as 'bugs', which can be exploited in order to obtain rights elevation. For example, once software code is available it can be screened for so-called 'buffer overflow' problems. A 'buffer overflow' problem arises when a temporary buffer is allocated with a smaller size than it is used. As a result, an attacker can use such a software fault to overwrite parts of the memory. Although programmers typically strive to avoid programming faults, such as buffer overflows, they are nevertheless known to happen.

Moreover, if an attacker also has the ability to modify the installed application he may be able to circumvent security measures in the application.

For example, if an attacker gains read access to an application for a loyalty program, he may find weaknesses which allow unauthorized increases in, e.g., an allotment of points that can be used for future purchases. If an attacker gains writing access to the application for the loyalty program, he may be able to increase the allotment of points directly.

As there are thousands of vendors of consumer products, such as mobile phones or PCs, and of smart cards, such as multiple application cards and white label cards, it is very hard for an application provider to verify if his application can run on the consumer products and if the application provider can trust the consumer product.

Problems such as these explain the slow uptake of multiple application smart cards in areas such as banking and content distribution.

SUMMARY OF THE INVENTION

It is an object of the invention to provide a mechanism to application providers with which they may obtain some measure of trust in an integrated circuit and/or with which they may obtain technical information regarding the integrated circuit.

The integrated circuit according to the invention comprises a communication module for providing information representing technical capabilities of the integrated circuit to a computing device external to the integrated circuit. The integrated circuit further comprises a combiner for combining the information with a cryptographic challenge, a key storage comprising a cryptographic signing key, and a signer for producing a signature over the combined information and the challenge using the signing key. The providing of the information representing technical capabilities comprises providing the signature to the computing device.

The integrated circuit achieves the object. An application provider who considers installing an application on the integrated circuit can verify the authenticity of the integrated circuit by verifying the signature. Since the signature includes a challenge he is assured that the signature is not merely a replay of old information. The signature was created with a secret key which is known by the integrated circuit. By verifying the signature the application provider can establish that the integrated circuit indeed has access to the secret key. This provides then a measure of trust in the integrated circuit, as other integrated circuits do not have access to this key. The application provider also obtains information regarding the integrated circuit's technical capabilities. From this information the application provider can derive at least to some extend if the integrated circuit has technical capabilities which are needed to run his application.

Without using a challenge the signature would still prove the authenticity of the information, but with the challenge the signature also proves the authenticity of the hardware.

It is an insight of the inventors that providing authenticity of an integrated circuit and providing technical information concerning the smart card may be combined in a single step. Note that it is not needed to run two separate protocols. Instead a simple protocol having only a query and a response suffices. The application provider (or any other party or external computer) may simply query the integrated circuit and from the response derive both a measure of trust in the origin and therefore security of the integrated circuit and on the technical information regarding the integrated circuit. This is possible since the integrated circuit comprises a combiner which combines a challenge and the technical information. The challenge provides cryptographic freshness, that is, a measure of certainty that the message was created for this instance of the protocol and is not a replay of an earlier run of the protocol possibly on a different integrated circuit. Moreover, only one signature operation is needed on the integrated circuit to authenticate both the integrated circuit and the information. Signature operations typically consume a relatively large amount of time. In particular, on integrated circuits with limited processing capabilities, such as smart cards and RFID tags, reducing the number of required signatures is considered an important advantage.

An integrated circuit may be any suitable miniaturized electronic circuit comprising semiconductor devices possibly also including passive components. An integrated circuit may be manufactured in the surface of a thin substrate of semiconductor material. Integrated circuits may use semiconductors, e.g., those produced using the CMOS technology.

Any integrated circuit according to the invention may be used in a smart card or an RFID tag, etc. Smart cards according to the invention may be used in set-top boxes, mobile phones, access systems, etc. An RFID (Radio-frequency identification) tag may be used for product identification and/or tracking, etc. The integrated circuit may be comprised in a Personal digital assistant (PDA), or in another product providing security features.

An integrated circuit according to the invention may be comprised in a home entertainment system, a game console, a game controller, etc. The integrated circuit may be comprised in a device extension, such as a device accessory, e.g. an accessory for a phone, in particular a smart phone.

The communication module allows digital communication between the integrated circuit and devices, outside of the integrated circuit. For example, communication module may be arranged for contact and/or contact-less communication, using connector pads and/or antenna respectively.

The information representing technical capabilities of the integrated circuit may represent capabilities of the hardware. The information may comprise a fixed string stored in a memory of the integrated circuit. All or part of the information may also be constructed as needed, for example, by querying hardware and/or software subsystems of the integrated circuit. Technical information concerning the integrated circuit may comprise any one of the following:

a type identifier, e.g. a number or a string, identifying the integrated circuit type and/or its manufacturer,
 an indication how much memory the integrated circuit comprises, possibly identified per type of memory, e.g., the amount of Electrically Erasable Programmable Read-Only Memory (E2PROM) comprised in the integrated circuit, how much volatile and/or non-volatile memory is free for storing a new application and/or how much memory would be available as working memory, an indication of available subsystems, the type, number, capabilities, etc of subsystems, such a co-processors, e.g., an indication whether a co-processor is available for large number arithmetic, time, data, place, etc, of the manufacture of the integrated circuit, the processing speed of a processing unit, e.g., CPU.

a string or code identifying the manufacturer.

It is convenient if the integrated circuit provides at least part of the information in a form which is readable by the external computing device without needing to verify the signature. For example, the readable part may comprise an indication of the manufacturer of the integrated circuit. The readable part assists in verifying the signature.

The integrated circuit may be queried by a computing device external to the integrated circuit and the integrated circuit may provide its response to, typically the same, computing device external to the integrated circuit. For example, the external computing device may be or comprise a card reader, a server, a desktop computer, a laptop, etc.

In an embodiment, the integrated circuit comprises an application receiver for receiving application computer code from the external computing device, and for installing the received application computer code in integrated circuit. For example, the application receiver may be configured for receiving the application computer code after the providing of the signature to the computing device. The application receiver may retrieve the application code from the communication module in the form of a file transfer protocol. The application receiver may be configured for such activities as removing of frames, verifying of checksum, verifying authenticity, discarding padding, applying error correcting information etc. After the application receiver has received the application code is ready for installing in a code memory. Installing in a code memory may comprise registering the application with an operating system which is present on the card. For example, installing of the application may comprise adding an entry address to a list of application entry addresses.

The combiner for combining the information with the cryptographic challenge may use various combining techniques. Preferably, the combiner is configured such that the challenge and/or the information are recoverable from the combination. For example, the cryptographic challenge may be concatenated with the information. The signature can then be performed over the concatenation. The combiner may also construct a digital data structure in which one or more fields represent the challenge and or more fields represent the information.

The combiner may also combine the information and the challenge such that one or both of the information and the challenge is not recoverable. For example, the combiner may compute a hash function, such as sha-1, over the challenge and the information. Preferably the hash function is a cryptographic hash function. If the information is not recoverable from the combination, then the information may be provided to the external computing device together with the signature. Note that also in this situation only two exchanges are needed between the external computing device and the integrated circuit, also only one signature needs to be computed. For example, the combiner may comprise a hash module for computing the hash function over the challenge and the information. The combiner may be integrated with the signer.

The challenge may be obtained from various sources.

In an embodiment, the challenge may be received from the computing device. This has the advantage that the external computing device can choose its own challenge. He can therefore be sure of the origin of the challenge. For example, the computing device may use a random number to generate the challenge. In this case, he can trust that the challenge is sufficiently random.

In an embodiment, the challenge comprises a timestamp obtained from a clock of the integrated circuit. It is possible, that a random challenge, especially if it is relatively short, may repeat itself. If this happens, a replay is possible. By using a clock for the challenge, the external computing device may simply compare the challenge with a clock of its own. In this way it is avoided that challenges are re-used. Moreover, it is also verified that the clock of the integrated circuit is accurate. For example, if a digital rights management (DRM) or content management application will be installed on the integrated circuit, an accurate clock is important. If the clock is not accurate, time controlled rights cannot be accurately controlled and/or executed.

In an embodiment, the challenge comprises a nonce obtained from the counter comprised in the integrated circuit, nonce being short for 'number used once'. The counter is configured to increase whenever a nonce is obtained. Using a counter also has the advantage that guarantees can be given regarding the nonce's uniqueness (at least until the counter rolls over), without needing a clock. A clock may require too many gates, and moreover, permanent power, e.g., battery power may not be available. Avoiding a clock is therefore of advantage. Signatures obtained in this embodiment may be verified by a signature verifier external to both the computing device and the integrated circuit. The signature verifier can keep track of the nonces he has seen and make sure that they do not repeat, e.g., by making sure that they increase. Rollover of the counter need not be a problem, for example, the maximum number of times a signature may be requested can be limited. For example, the maximum number of applications that can be installed can be limited. The limit may be chosen below the maximum value of the counter.

The cryptographic signing key is a secret key. Nevertheless, some trusted parties may know the secret key. For example, the secret key may be known to a signature verifier, to the integrated circuit manufacturer, etc.

In an embodiment, the signing key is a private key from a public-private key pair. The signing may then use a signature operation known from public-private key cryptography, also known as asymmetric cryptography. For example, the RSA Cryptography Standard (PKCS #1 v2.1) gives two examples of a signing/verification algorithm based on RSA: RSASSA-PSS and RSASSA-PKCS1-V1.5. For both of these algorithms a signing key is needed. Two key types are employed: an RSA public key and an RSA private key. Together, the RSA public key and the RSA private key form an RSA public-private key pair. A public-private key pair is also referred to simply as a key pair. For signing operations the RSA private key is needed. Other signature algorithms using a public-private key pair include DSA, ECDSA, ElGamal signature scheme, etc.

The signer is configured for producing a signature using a signature algorithm, such as described above. If performance of the signer is important most or even the entire signer may be implemented in hardware. On the other hand, the signer may also be implemented using a general purpose processor executing signing software.

An advantage of using an asymmetric signature scheme is that the signature may be verified with a verification key which is different from the signing. The verification key is not necessarily secret since the signing key cannot be derived from the verification key. The signing key is a private key. The verification key is a public key. This gives a key management advantage since security considerations may be relaxed for distribution of the verification key.

In an embodiment, the signing key is a symmetric key for use in a symmetric authentication algorithm. The symmetric authentication algorithm is used to generate signature. To verify the signature, access to the signing key may be needed. It is preferred to have the signature verification at a centralized location. For example, the manufacturer may perform this service, or a third party server designated for this purpose. Symmetric signatures need much fewer computation resources. This solution is well suited for application in RFIDs or Smart cards without a cryptographic co-processor. Examples of symmetric authentication algorithms include Message authentication codes (MACs). A MAC may be based on a block cipher. For example, the block cipher may be used in CBC-MAC or CMAC mode, etc. Examples of block ciphers include DES, AES, etc. A MAC may be based on a cryptographic hash function, for example, by using the hash function in HMAC mode. Examples of hash functions include SHA-1, Ripemd, sha-256, etc.

The key storage may be a secure key storage. For example, key storage may store the secret key in designated EEPROM cells, which are optimized regarding security. For example, non-volatile, one-time-programmable (OTP) memory may be used for the key storage.

The signer for producing a signature over the combined information and the challenge using the signing key may produce a signature which is separable from the message. That is the integrated circuit may provide to the computing device first digital data comprising the information representing technical capabilities and second digital data comprising the signature. The signer may also produce a signature with message recovery. In that case only the signature needs to be provided to the external computing device. The signature may then be verified to verify authenticity but also the technical information may be recovered from it. When a signature with message recovery is used then preferably also a combiner with recovery is used.

If the challenge is not received from the external computing device it may be provided to the external computing device using any of the mentioned providing ways.

In an embodiment, the integrated circuit comprises a code memory for storing computer code, and a processing unit for executing code stored in the code memory. The combiner further combines the challenge with computer code information representing technical capabilities of the computer code.

An application provider may also be concerned about an operating system that is installed on the integrated circuit. By signing information of the operating system the application provider also is informed of the trustworthiness of the operating system. The operating system is typically installed on the integrated circuit during manufacture. For example, most or all of the software code of the operating system may be installed in the integrated circuit in the form of a read only memory (ROM). As the ROM is manufactured together with the hardware it is appropriate to inform the application provider about it. The technical information that may be communicated to the application provider includes the same and/or similar information as the information which may be communicated about the hardware itself. For example, the technical information about the operating system may include any one of the following:

operating system id operating system type, manufacturer, version, date and time of compilation, capabilities certification technical standard to which it conforms, e.g., Java card, etc a checksum computed over all or part of a code memory, e.g. over all or part of the OS, etc.

The operating system id may be a unique id which is stored on the integrated circuit, e.g. in a ROM. The operating system id may be queried with a third party server and/or the manufacturer to see if that id has indeed been installed on precisely one integrated circuit manufactured by that manufacturer.

Any other kind of data that is deemed useful can be added as information.

In an embodiment, the integrated circuit comprises the application receiver is configured for receiving application information from the computing device. The application information may be stored with the application code or in an information memory, etc. The combiner is configured for combining a further challenge with the application information after the application computer code has been installed.

A further application provider who wishes to see what applications have been installed, in addition to the installed OS and hardware can request information of the application, which may have been received by an application receiver. The application information is signed. This tells the application provider that the application was installed with a trusted OS and trusted hardware.

In an embodiment, providing the information representing technical capabilities comprises providing a certificate to the computing device for use in verifying the signature, wherein the certificate is authenticated and comprises the public key from the public-private key pair.

One way to enable the external computing device, e.g. the application provider, to verify a signature created with a private signing key of the integrated circuit is to provide a certificate. A certificate comprises the public key corresponding to the private key. The certificate is signed by some signing authority or by the manufacturer. For example, X.509 certificates may be used. The external computing device may obtain a root certificate, such as the certificate of signing authority or of the manufacturer for verifying the certificate of the integrated circuit from a different source.

A further aspect of the invention concerns a system for installing application computer code on an integrated circuit. The system comprises the integrated circuit and the external computing device. The computing device comprises or is connectable to a signature verifier configured for verifying the signature.

In an embodiment of the system, the signing key is a symmetric key and wherein the signature verifier is configured to contact a third party server for verifying the signature. The third party server is different from the external computing device. The third party server may be the manufacturer of the integrated circuit. The third party server has access to the symmetric key to verify the signature.

In an embodiment of the system, the computing device comprises an information comparator for comparing the information representing technical capabilities received from the integrated circuit with a predetermined set of required technical capabilities, the computing device being configured to allow installing application computer code in dependency on the comparison.

For example, an application may be written using 8051 assembly. The received technical information may contain information indicating if 8051 assembly can be executed. For example, a string may be comprised in the information signaling compatibility with a particular assembly code set. The string may be '8051'. After the computing device received the technical information he may scan it to see if the information signaling compatibility with the needed assembly code set is present. For example, the information comparator may scan the information for the string, e.g., the string '8051'. If the information is present, and if the signature verification algorithm indicates that the signature was valid, the computing device may proceed with installing the application.

The information comparator may be integrated in an application uploader of the external computing device. The application uploader is configured for installing on the integrated circuit the application code.

A further aspect of the invention concerns a method of providing information representing technical capabilities of an integrated circuit to a computing device external to the integrated circuit comprising receiving from the computing device a cryptographic challenge combining the information with the challenge, and producing a signature over the combined information and the challenge using a cryptographic signing key. Providing the information representing technical capabilities comprises providing the signature to the computing device.

In an embodiment of the method, the method comprises verifying the signature by the computing device, and installing the application computer code on the integrated circuit.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc.

In a preferred embodiment, the computer program comprises computer program code means adapted to perform all the steps of a method according to the invention when the computer program is run on a computer. Preferably, the computer program is embodied on a computer readable medium.

An integrated circuit, a system or a method according to the invention allows an application provider to obtain trust in an integrated hardware. By verifying the signature he is assured of the manufacturer of the hardware. That is, he knows which manufacturer made the hardware. For example, if an application provider determines through the signature that the integrated circuit was made by a particular well-known manufacturer known for secure products, then the application provider is assured of the high quality of the integrated circuit. Accordingly, he will be more prepared to install his application on that device, in particular, applications which require a high security. Moreover, if the information in the signature indicates that the manufacturer also installed an operating system, he is further assured that this can be trusted, since it was done by a party he trusts.

The hardware vendor is able to prove to application providers the uniqueness and authenticity of the hardware including the contained software configuration (OS and optional applications). With that the hardware vendor indicates his trust that the installed operating system was delivered by the designated operating system vendor. The application provider gets to know the OS vendor and can check if the OS is trusted and again is able to see which applications are pre-installed and if they are trusted as well.

An integrated circuit may contain a unique asymmetric private key created at hardware production time or at a subsequent wafer test time together with the asymmetric public key that is stored by the hardware vendor. The private key is used to generate the signature of the information from the application provider, the application, the OS and/or the hardware. Through verification of this signature the origin of the secure hardware and therewith the root of trust can be proven at any point in the value chain.

Once applications are loaded into the integrated circuit, even while being in the field or in consumer hands, the application provider can use an application which was installed earlier as a starting point for the trust creation. As a result the application provider gets definite knowledge that the application is really running on top of a trusted secure hardware executing a trusted operating system.

The combiner may be configured to only use information stored in a read only memory. In that case only information known at manufacturer time, e.g., hardware and OS information, can be included in the signature. This has the security advantage that an attacker has less possibilities to tamper with the signature mechanism. Configuring the combiner in this way may be hardwired or done in software, preferably stored in a read-only memory as well.

An integrated circuit is provided, which is configured for authentication itself and technical information concerning the integrated circuit or its installed software to an external computing device. The integrated circuit comprises a signer for producing a signature over the information and a challenge using a cryptographic signing key, and a communication module for providing the information and the signature to the computing device. In response to receiving the information and the authentication, the computing device may install new application code on the integrated circuit. After the installation, the integrated circuit may authenticate information concerning the new application code to other computing devices. The integrated circuit is advantageously a multiple application smart card, since it allows application providers to obtain trust in the multiple application smart card without having a relationship with its manufacturer.

BRIEF DESCRIPTION OF THE DRAWINGS

The invention is explained in further detail by way of example and with reference to the accompanying drawings, wherein.

Throughout the Figures, similar or corresponding features are indicated by same reference numerals.

Figure 1:
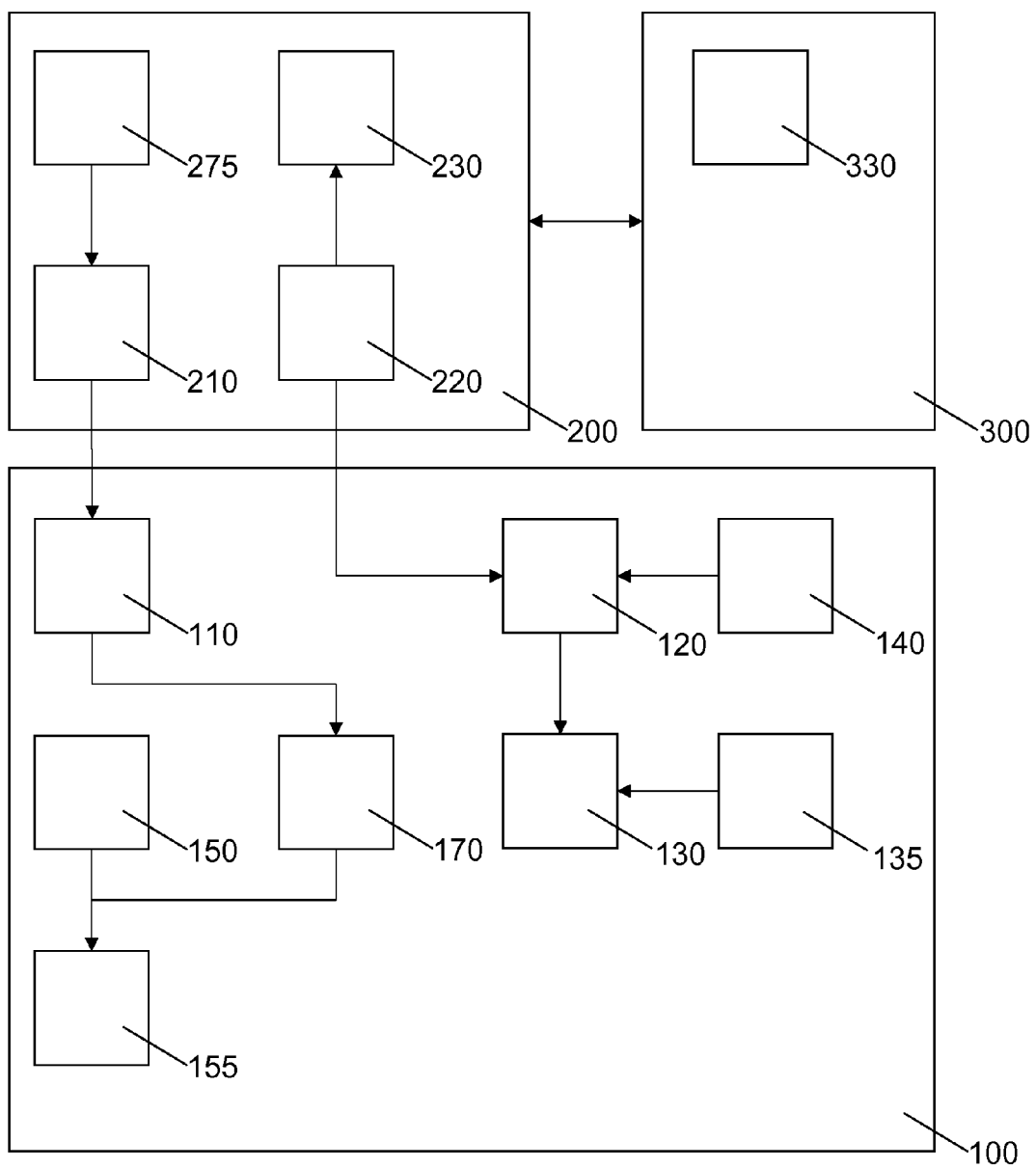
FIG. 1 is a block diagram illustrating an embodiment of a system according to the invention.

LIST OF REFERENCE NUMERALS 100 an integrated circuit
110 a communication module
120 a combiner
130 a signer
135 a key storage
140 an information storage
150 a processing unit
155 a code memory
170 an application receiver
200 a computing device
210 a communication module
220 a challenger
230 a signature verifier
275 an application uploader
300 a third party server 330 a signature verifier
400 a system for installing application computer code on an integrated circuit
500 a smart card
505 a supporting card
510 an integrated circuit
520 a processing unit
522 a memory
524 a co-processor
526 a communication element
530 a bus
610 receiving a cryptographic challenge
620 combining information with the challenge
630 producing a signature over the combined information and the challenge using a cryptographic signing key
640 providing the signature to a computing device
650 verifying the signature by the computing device
660 installing the application computer code on the integrated circuit
665 a first phase
666 a second phase

DETAILED EMBODIMENTS

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described.

FIG. 1 illustrates in a schematic way an embodiment of an integrated circuit 100 according to the invention. FIG. 1 further shows in a schematic way an embodiment of system 400 according to invention comprising the integrated circuit 100. System 400 may be used for installing application computer code on an integrated circuit 100. FIG. 1 shows many optional refinements which may be omitted to simplify the design or to use integrated circuit 100 in different applications. Some of the possible data dependencies are indicated in FIG. 1 with arrows.

System 400 comprises an integrated circuit 100, an external computing device 200 and optionally a third party server 300. Integrated circuit 100 may be comprised in a smart card, an RFID tag, a mobile phone, a computer, etc. Computing device 200 may belong to an application provider, and may be used to install applications on integrated circuit 100.

Computing device 200 and integrated circuit 100 are configured so that computing device 200 may obtain technical information from integrated circuit 100 and may verify the authenticity of integrated circuit 100.

Integrated circuit 100 comprises a communication module 110. Computing device 200 comprises a communication module 210. For example, communication module 210 may comprise a card reader, and communication module 110 may comprise connector pads. Computing device 200 may comprise a server. Computing device 200 and third party server 300 may be connected with each other through some kind of network, e.g., the Internet. Computing device 200 and third party server 300 may communicate using a secure channel, e.g., using encryption and authentication mechanism. Communication module 110 may be a passive module, allowing computing device 200 to read some of the registers and/or memories of integrated circuit 100. Computing device 200 may be an active module, actively sending information to integrated circuit 100.

Integrated circuit 100 comprises a combiner 120. Combiner 120 combines information with a cryptographic challenge.

Integrated circuit 100 optionally comprises an information storage 140 for storing the information. For example, the information may be stored in information storage 140 during manufacture of integrated circuit 100. For example, information storage 140 may be a ROM. However, the information may also be constructed when it is needed. For example, combiner 120 may query components of integrated circuit 100 for information concerning their capabilities. Combiner 120 may combine, e.g., concatenate the queried and received information.

Computing device 200 optionally comprises a challenger. Combiner 120 may receive the challenge, through communication module 210 and communication module 110 from challenger 220. However, combiner 120 may obtain a challenge from a different source. For example, integrated circuit 100 may comprise or be connectable to a clock (not shown). In that case a time stamp may be used as challenge. For example, integrated circuit 100 may comprise a counter (not shown) which is incremented whenever a signature is produced. For example, integrated circuit 100 may comprise a non-decreasing counter, which provides a single interface which both reads out the counter and increments it.

Combiner 120 is configured for combining a challenge with the information, e.g., a challenge from challenger 220 with information from information storage 140. Combiner 120 may concatenate the information and the challenge, for example, put the challenge after the information. Combiner 120 may use some other combination function.

Integrated circuit 100 comprises a key storage 135 for storing a cryptographic signing key. For example, key storage 135 may comprise non-volatile memory, e.g., E2PROM memory. For example, key storage 135 may comprise secure memory, e.g., fuses.

Integrated circuit 100 comprises a signer 130 connected to combiner 120 and key storage 135. Signer 130 is configured to produce a signature over the combined information and the challenge using the signing key. For example, signer 130 may be configured to execute the RSA signing algorithm using an RSA private key on a concatenation of the information and the challenge.

The signature is send to computing device 200 via communication module 110. Integrated circuit 100 may also send the information. Integrated circuit 100 may also send the challenge. If the signature allows message recovery, then integrated circuit 100 does not need to send the information separate from the signature.

If integrated circuit 100 is used for receiving applications then integrated circuit 100 may comprise an application receiver 170 for receiving application computer code and possibly application information from an application uploader 275. The application uploader 275 may be comprised in computing device 200. Integrated circuit 100 may also be used for other purposes than receiving new applications. In that case, application receiver 170 and application uploader 275 may be omitted. If so desired, application uploader 275 may format the application code in a format suitable for uploading to integrated circuit 100, e.g., according to some file transfer protocol.

For example, integrated circuit 100 may be used to provide both authenticity of the integrated circuit and authenticated information to an external computing device. For example, the integrated circuit 100 may be used only with applications which come pre-installed by the manufacturer, and may not be able to receive and/or install additional applications. In that case, computing device 200 may nevertheless need information on the applications which are installed.

Integrated circuit 100 optionally comprises a code memory 155 and a processing unit 150. Application receiver 170 may then be configured to install the received application computer code in code memory 155.

Integrated circuit 100 may comprise additional code, possibly in code memory 155 or in some other memory of integrated circuit 100 (not shown). For example, code memory 155 may comprise operating system code. Code memory 155 may comprise applications which were installed previously. The previously installed applications may include applications which were installed during manufacture of 100. Operating code and/or previously installed applications may be installed in ROM. The operating system and the installed applications may also provide information. Combiner 120 may include the information from the operating system and/or installed application in the information combined with the challenge.

An additional sign function may be provided by the operating system or an installed application. In this way the OS vendor could also sign the information and signature of the secure hardware manufacturer to indicate that he trusts the secure hardware manufacturer as well and so on. With that a bi-directional chain of trust may be created if needed.

For example, together with the OS or application code a second signing key, e.g., a private key such as a RSA private key may be installed in a read only memory of the integrated circuit during manufacture. The OS or application may comprise signing algorithm code to produce a second signature using the second signing key over the information and/or the signature produced by signing key stored in the key storage. The second signature may also be provided to the external computing device. The external computing device can verify both signatures.

Computing device 200 optionally comprises a signature verifier 230. Alternatively, computing device 200 may contact an optional third party server 300 comprising a signature verifier 330 for verification of signatures. For additional assurance, both signature verifier 230 and signature verifier 330 may be used, but typically only one of signature verifier 230 and signature verifier 330 will be used. If third party server 300 establishes that the signature is genuine, he will inform the external computing device 200 that the integrated circuit 100 was indeed manufactured by the claimed manufacturer. If third party server 300 establishes that the signature is forged, he will inform external computing device 200 not to install his application on the integrated circuit, since he cannot vouch for the authenticity of the integrated circuit.

Third party server 300 may perform additional functions. For example, third party server 300 may update a list of all the challenges used by integrated circuit 100. Third party server 300 is then in a position to see if integrated circuit 100 has re-used the same challenge. In the latter situation the computing device 200 may be informed not to upload applications to integrated circuit 100. If no third party server 300 is used, computing device 200 is configured for verifying signatures using signature verifier 230.

Signature verifiers 230 and 330 use a signature verification algorithm compatible to the signature algorithm used by signer 130, e.g. the RSA public key signature verification algorithm which is compatible with RSA private key signing.

System 400 may also use symmetric algorithms. In that case it is preferred to omit signature verifier 230 and verify the signatures using signature verifier 330.

One way of using system 400 is as follows. A user of integrated circuit 100 approaches an application provider. For example, the customer takes his integrated circuit 100 to a shop to have a loyalty program installed on integrated circuit 100. The loyalty application may keep track of the amount of money which spent at the shop. Discounts may be available once a certain amount of money has been spent. For example, integrated circuit 100 may be integrated in the customer's mobile phone. The store owner, that is, the application provider, did not select the particular brand of mobile phone or SIM the customer is using, let alone that the shop owner negotiated their security properties with the mobile phone manufacturer. Moreover, the application provider does not know if integrated circuit 100 is capable of running the application.

The computing device 200 of the application provider asks integrated circuit 100 for technical information. For example, integrated circuit 100 may have an interface that the application provider can reach. An interface could be a specific command or set of commands but it could also be realized as a specific or even dedicated physical interface. On the level of the operating system an application programming interface (API) might be defined that can be called by an application running on it. On the hardware of integrated circuit 100 itself also an entry point may be defined so that the operating system can hand over the collected set of information and get back the signed extended set of information. This entry point might be realized as a normal function call into a specific memory area, the trigger of a software interrupt or any other method supported by the secure hardware to start the execution, etc.

Challenger 220 may create a challenge, say a random number, say a random 32 bit number, and send it to integrated circuit 100. As an example, challenger 220 may produce the hexadecimal number 0x2856a83b. Combiner 120 then combines technical information. Part of the technical information may be stored in a fixed form in information storage 140, part of the technical information may be obtained from the operating system, etc. combiner 120 combines the information with the challenge and forwards it to signer 130. For example, the information may be a string. Technical information can also be represented as a bit string, wherein a specific individual bit or bits represent the presence or absence of a specific technical feature. For example, the string 'NXP 8051', indicating the manufacturer of the integrated circuit (NXP) and the type of assembly language that the integrated circuit is compatible with. The string may be also be represented as a hexadecimal number, e.g., using ASCII representation. For example, the hexadecimal number 4e58502038303531 represents the information string given in the example above. In embodiment using concatenation for combination, the combiner may produce the combination '4e585020383035312856a83b'. Signer 130 signs the combination, using any suitable signing algorithm. The signature and the technical information are then forwarded to computing device 200. For example, the signature and the combination may be sent to the computing device. Combiner 120 may also determine if the operating system of integrated circuit 100 is present in a ROM and include this information in the combination of information and challenge.

Comparing the information representing technical capabilities of the integrated circuit with technical requirements of the application which is to be installed may be performed by an information comparator (not separately shown). The information comparator may be integrated in application uploader 275. For example, the information comparator may search the received information, possibly after a decryption step, for required substrings, such as substring '8051'.

Information representing technical capabilities of the integrated circuit comprises information representing technical capabilities of the integrated circuit's hardware and/or software installed in a read-only memory (ROM) of the integrated circuit and/or software installed in a non-volatile memory, such as flash memory, of the integrated circuit.

Possibly, integrated circuit 100 also sends a certificate of its public key to computing device 200. Computing device 200 uses signature verifier 230 and the certificate to verify the signature. Alternatively, computing device 200 may send the data that it received from integrated circuit 100 to third party server 300. Third party 300 may comprises a list of all public keys used in the field and use that to verify the signature. Integrated circuit 100 may also send an identifier, identifying integrated circuit 100 and/or its public key, to computing device 200 and/or third party server 300. For example, the identifying identifier may be a hash of the public key. The identifier may be used as an in index in the list of public keys. If signature verifier 230 or third party server 300 confirms the authenticity of integrated circuit 100, then computing device 200 is assured that the hardware integrated circuit 100 was really made by a known manufacturer which the application provider may trust. Alternatively, it may turn out that integrated circuit 100 was made by a manufacturer which is not trusted by the application provider. It may even turn out that integrated circuit 100 is not able to prove its origins. For example, it may turn out that the signature is incorrect or that no public key could be found corresponding to the public key identifier. After the application provider is satisfied that the hardware was made by manufacturer that it trusts, he may consider the operating system. The operating system of integrated circuit 100 is typically present in a ROM code. If the computing device 200 determines that the information received from integrated circuit 100 comprises the indication that the operating system was installed by the manufacturer of integrated circuit 100, then the application provider may at least be assured that a party that it trusts has installed the operating system. By implication the application provider may also trust the operating system. Even applications installed on top of the operating system also during manufacture of integrated circuit 100 may be trusted. It may be determined from the technical information that in fact they were installed during manufacture.

Applications installed on integrated circuit 100 after manufacture, for example, using a method according to the invention may also use the mechanism described to make the installed applications known to further applications which are not yet installed. The application provider only receives limited trust in the later installed application, since the manufacturer of integrated circuit 100 did not known the contents of that application. But at least the application provider may be assured that the later application was installed with the operating system in a proper way, at least up to the point that combiner 120 is able to receive technical information from it.

When the application provider trusts integrated circuit 100 sufficiently, he may use the technical information to determine if this application will actually run on integrated circuit 100. For example, if he may verify if the correct assembly language is used, if a sufficient amount of memory is free, if a co-processor is available, if the correct operating system is used etc. Note that an application designed for a co-processor may work even though integrated circuit 100 does not have the co-processor if the operating system simulates the co-processor. However, an unacceptable loss of performance may result. Accordingly, integrated circuit 100 may decide that he is better off not installing the application, rather than risk customer complaints. In this case, the operating system may show a certain capability, say large number arithmetic, but since the technical information of the hardware does not show a co-processor integrated circuit 100 may still refrain from installing the application.

Once the application provider is satisfied that integrated circuit 100 will be able to run the application, application uploader 275 may send the application to application receiver 170. Application receiver 170 accepts the applications and installs it in code memory 155. Processing unit 150 is then able to run the application.

If the application included technical information then after this installation, combiner 120 is able to combine additional information, namely the information corresponding to the application with any further challenges it may receive. A further application provider is then able to see that the application was installed using this mechanism.

Figure 2A:
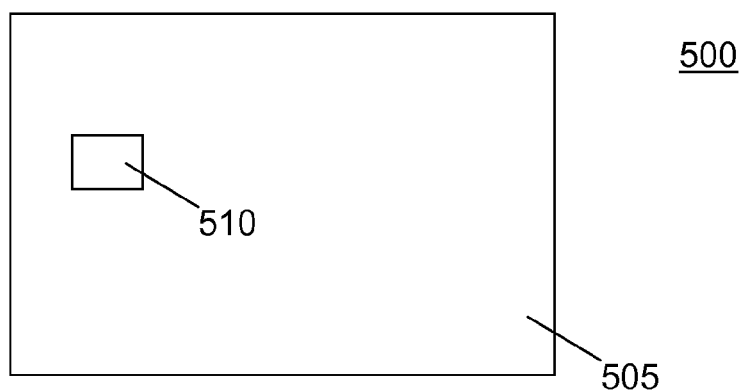
FIG. 2a shows a schematic top-view of a smart card.
Figure 2B:
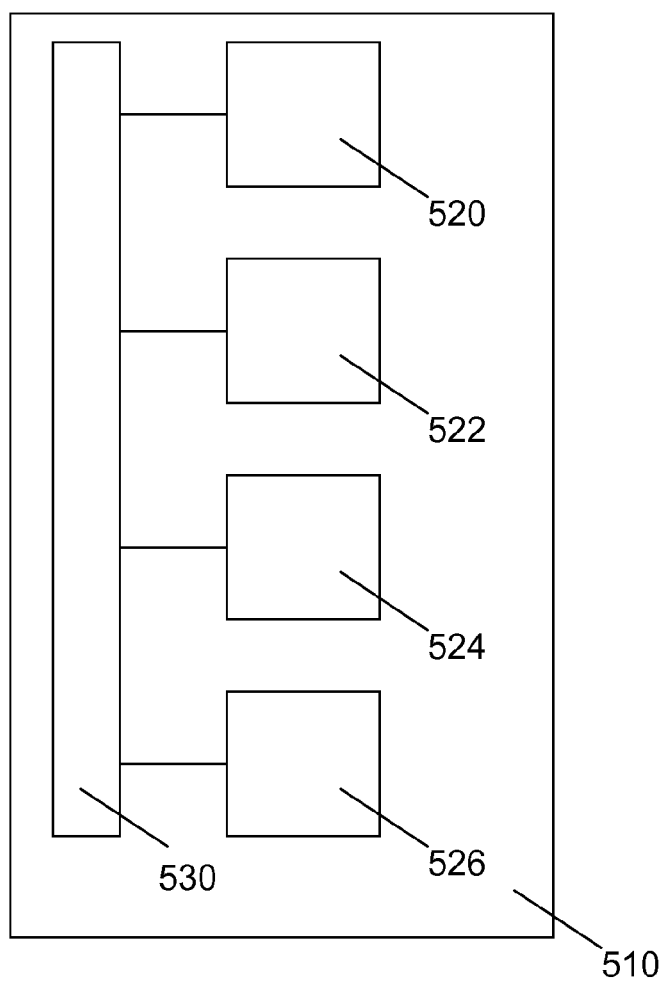
FIG. 2b is a block diagram illustrating an integrated circuit.

FIG. 2a shows in top-view a schematic representation of a smart card 500 according to the invention. The smart card comprises an integrated circuit 510 and a, typically plastic, supporting card 505 supporting integrated circuit 510. The architecture of integrated circuit 510 is schematically shown in FIG. 2b. Circuit 510 comprises a processing unit 520, e.g. a CPU, for running computer program components stored in memory 522, including those stored in ROM during manufacture, such as operating system code and pre-installed applications, and applications which were installed in non-volatile memory after manufacture. Circuit 510 comprises a memory 522 for storing programming code, data, cryptographic keys, technical information, etc. Part of memory 522 may be read-only. Circuit 510 comprises a co-processor 524. Circuit 510 may comprise a communication element 526, e.g., an antenna, connector pads or both. Processing unit 520, memory 522, co-processor 524 and communication element 526 may be connected to each other via a bus 530. The card may be arranged for contact and/or contact-less communication, using connector pads and/or an antenna, respectively.

For example, code in memory 522 executable by processing unit 520 may implement a combiner and a signer. The signing code may make use of the co-processor 524, for example to perform large number arithmetic used in some signing algorithms, e.g. RSA. Co-processor 524 may also provide hardware support for other algorithms, in particular cryptographic algorithms such as hashes. Memory 522 may comprise key storage 135, information storage 140, and code memory 155. Code in memory 522 using the communication element 526 and executable by processing unit 520 may implement application receiver 170.

Note that integrated circuit 100 may also be implemented entirely in hardware or using a field-programmable gate array.

Figure 3:
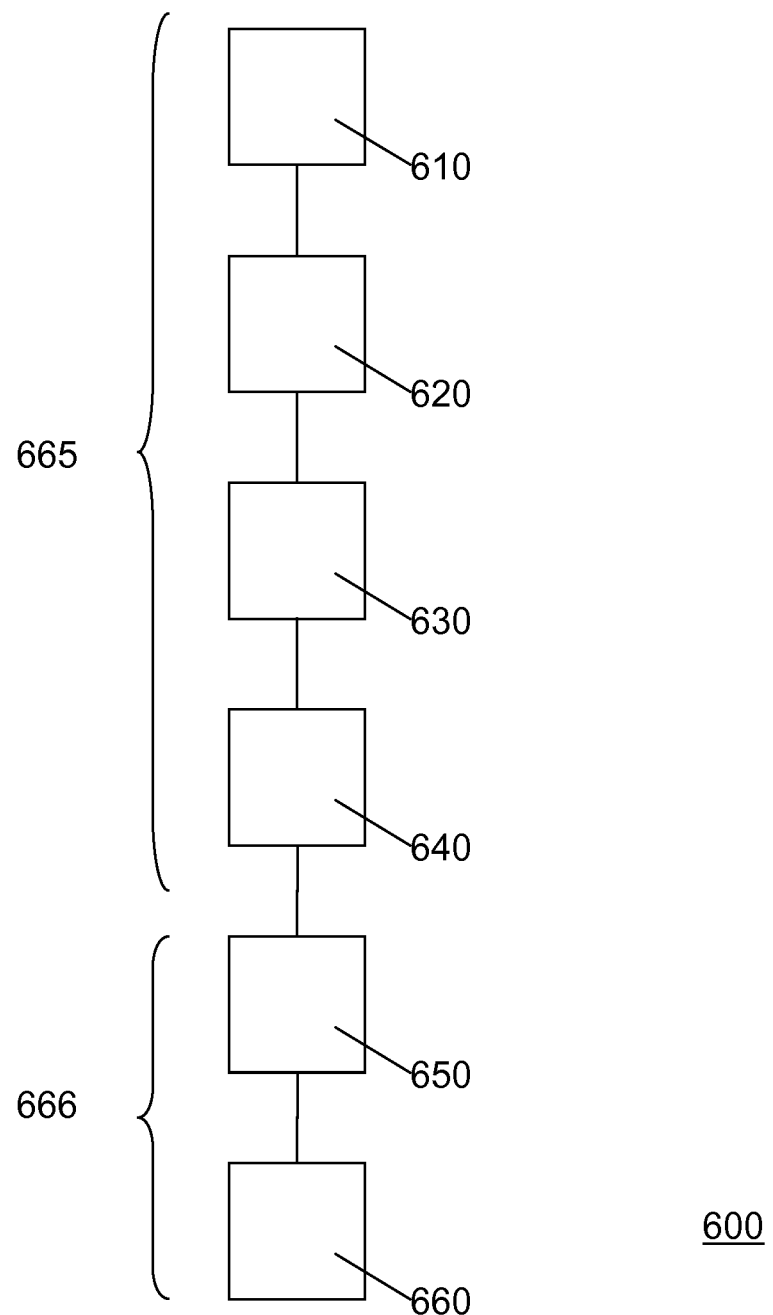
FIG. 3 is a flow chart illustrating a method according to the invention.

FIG. 3 illustrates with a flow chart a method according to the invention. The flow chart shows two phases which may also be implemented in independent methods. Flow chart elements 610, 620, 630 and 640 illustrate actions which may be performed by an integrated circuit. Flow chart elements 650 and 660 illustrate actions which may be performed by an external computing device. At least two phases may be distinguished. A first phase is illustrated with brace 665 and relates to flow chart elements 610, 620, 630 and 640. A second phase is illustrated with brace 666 and relates to flow chart elements 650 and 660. During the first phase, the integrated circuit performs actions which allow simultaneous authentication of the circuit and of the information. During the second phase, the signature is verified and an application may be installed.

Flow chart element 610 represents receiving from the computing device a cryptographic challenge. Flow chart element 620 represents combining the information with the challenge. Flow chart element 630 represents producing a signature over the combined information and the challenge using a cryptographic signing key. Flow chart element 640 represents providing the signature to the computing device. Flow chart element 650 represents verifying the signature by the computing device. Flow chart element 660 represents installing the application computer code on the integrated circuit.

Many different ways of executing the method are possible, as will be apparent to a person skilled in the art. For example, in between steps other method steps may be inserted either. The inserted steps may represents refinements of the method such as described herein, or may be unrelated to the method. For example, steps 620 and 630 may be combined. Moreover, a given step may not have finished completely before a next step is started.

A method according to the invention may be executed using software, which comprises instructions for causing a processor system to perform method 600. Software may only include steps taken by an integrated circuit, or only those taken by an external computing device or third party server. The software may be stored in a suitable storage medium, such as a hard disk, a floppy, a memory, etc. The software may be sent as a signal along a wire, or wireless, or using a data network, e.g., the Internet. The software may be made available for download and/or for remote usage on a server.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. It will also be appreciated that such a program may have many different architectural designs. For example, a program code implementing the functionality of the method or system according to the invention may be subdivided into one or more subroutines. Many different ways to distribute the functionality among these subroutines will be apparent to the skilled person. The subroutines may be stored together in one executable file to form a self-contained program. Such an executable file may comprise computer executable instructions, for example, processor instructions and/or interpreter instructions (e.g. Java interpreter instructions). Alternatively, one or more or all of the subroutines may be stored in at least one external library file and linked with a main program either statically or dynamically, e.g. at run-time. The main program contains at least one call to at least one of the subroutines. Also, the subroutines may comprise function calls to each other. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth. These instructions may be subdivided into subroutines and/or be stored in one or more files that may be linked statically or dynamically.

The carrier of a computer program may be any entity or device capable of carrying the program. For example, the carrier may include a storage medium, such as a ROM, for example, a CD ROM or a semiconductor ROM, or a magnetic recording medium, for example, a floppy disc or hard disk. Furthermore, the carrier may be a transmissible carrier such as an electrical or optical signal, which may be conveyed via electrical or optical cable or by radio or other means. When the program is embodied in such a signal, the carrier may be constituted by such cable or other device or means. Alternatively, the carrier may be an integrated circuit in which the program is embedded, the integrated circuit being adapted for performing, or for use in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage

The invention claimed is:

1. An integrated circuit comprising:
    a communication circuit configured to provide technical information representing capabilities of the integrated circuit to a computing device external to the integrated circuit;
    a combiner configured to obtain a cryptographic challenge and combine the technical information with the cryptographic challenge, wherein the combiner concatenates the technical information and the challenge;
    a key storage comprising a cryptographic signing key; and
    a signer configured to produce a signature over the combined technical information and the cryptographic challenge using the cryptographic signing key and provide the signature to the external computing device; and
    an application receiver configured to receive, after the signature is provided to the external computing device, application computer code, install the received application computer code in a code memory of the integrated circuit to enable the integrated circuit with a new functionality, and receive application information from the external computing device, wherein the combiner is configured to combine a further challenge with the application information after the application computer code has been installed.

2. The integrated circuit as in claim 1, wherein the communication circuit is further configured to receive the cryptographic challenge from the external computing device.

3. The integrated circuit as in claim 1, wherein the integrated circuit comprises a clock and the cryptographic challenge comprises a timestamp obtained from the clock.

4. The integrated circuit as in claim 1, wherein the integrated circuit comprises a counter, the cryptographic challenge comprises a nonce obtained from the counter, and the counter is configured to increase a count when the nonce is obtained.

5. The integrated circuit as in any one of the preceding claims, wherein the integrated circuit comprises:
    a code memory configured to store computer code; and
    a processor configured to execute code stored in the code memory, wherein the combiner is configured to combine the cryptographic challenge with the technical information representing the capabilities of the computer code.

6. The integrated circuit as in claim 1, wherein the cryptographic signing key is a private key from a public-private key pair.

7. The integrated circuit as in claim 6, wherein providing the technical information comprises:
providing a certificate to the external computing device; and
authenticating the certificate, wherein the certificate comprises a public key from the public-private key pair.

8. A system configured to install application computer code, the system comprising the integrated circuit and the external computing device of claim 1, wherein the external computing device is configured to use a signature verifier configured to verify the signature.

9. The system of claim 8, wherein the signing key is a symmetric key and the signature verifier is configured to contact a third party server to verify the signature.

10. The system of claim 8, wherein the external computing device comprises:
1. an information comparator configured to compare the technical information received from the integrated circuit with a predetermined set of required technical capabilities, wherein the external computing device is configured to allow installing application computer code based on the comparison.

11. A method comprising:
2. obtaining a cryptographic challenge combining technical information representing capabilities of an integrated circuit to a computing device external to the integrated circuit with the cryptographic challenge, wherein the technical information and the challenge are concatenated;
3. producing a signature over the combined technical information and the cryptographic challenge using a cryptographic signing key;
4. providing the signature to the external computing device;
5. receiving application computer code after the providing of the signature to the external computing device;
6. installing the received application computer code in a code memory of the integrated circuit to enable the integrated circuit with a new functionality;
7. receiving application information from the external computing device; and
8. combining a further challenge with the application information after the application computer code has been installed.

12. The method of claim 11, comprising: verifying the signature by the external computing device: and installing the application computer code on the integrated circuit.

13. The integrated circuit of claim 1, wherein the combiner queries components of the integrated circuit for the technical information concerning their capabilities.

14. The integrated circuit of claim 1, wherein the combiner obtains the technical information from an operating system of the integrated circuit.

15. The integrated circuit of claim 1, wherein the combiner computes a hash function over the challenge and the technical information.

16. The integrated circuit of claim 10, wherein the information comparator is integrated in an application uploader of the external computing device.

17. The integrated circuit of claim 1, wherein the combiner is configured to only use the technical information stored in a Read Only Memory (ROM).

18. The integrated circuit of claim 1, wherein the communication circuit comprises connector pads.

19. The integrated circuit of claim 1, wherein the key storage is a Read Only Memory (ROM).

* * * * *